(12) United States Patent
Lee

(10) Patent No.: US 7,506,223 B2
(45) Date of Patent: Mar. 17, 2009

(54) METHOD AND SYSTEM FOR SENSING A SHOCK IN OPTICAL DISK DEVICE

(75) Inventor: Yong-Hyun Lee, Gyeonggi-do (KR)

(73) Assignee: Reigncom Ltd., Seoul (KR)

( * ) Notice: Subject to any disclaimer, the term of this patent is extended or adjusted under 35 U.S.C. 154(b) by 784 days.

(21) Appl. No.: 10/508,387

(22) PCT Filed: Mar. 12, 2003

(86) PCT No.: PCT/KR03/00480

§ 371 (c)(1),
(2), (4) Date: Sep. 20, 2004

(87) PCT Pub. No.: WO03/079354

PCT Pub. Date: Sep. 25, 2003

(65) Prior Publication Data
US 2005/0193282 A1 Sep. 1, 2005

(30) Foreign Application Priority Data
Mar. 20, 2002 (KR) ............ 10-2002-0015069

(51) Int. Cl.
 *H03M 13/00* (2006.01)
 *G06F 11/00* (2006.01)
(52) U.S. Cl. ............... 714/708; 714/704; 714/756
(58) Field of Classification Search ............ 714/756, 714/704, 708
See application file for complete search history.

(56) References Cited

U.S. PATENT DOCUMENTS

| | | | | |
|---|---|---|---|---|
| 6,115,200 A * | 9/2000 | Allen et al. | ............... | 360/60 |
| 6,178,058 B1 * | 1/2001 | Pan et al. | ............... | 360/60 |
| 6,181,651 B1 * | 1/2001 | Kishimoto et al. | ....... | 369/44.28 |
| 6,310,845 B1 * | 10/2001 | Kanenaga et al. | ......... | 369/53.1 |
| 6,377,527 B1 * | 4/2002 | Hirashima | ............... | 369/53.23 |
| 6,735,033 B1 * | 5/2004 | Codilian et al. | ............... | 360/60 |
| 7,321,477 B2 * | 1/2008 | Suzuki et al. | ............... | 360/60 |
| 7,333,285 B2 * | 2/2008 | Cho et al. | ............... | 360/75 |
| 2003/0117919 A1 * | 6/2003 | Tatsuta | ............... | 369/53.19 |
| 2005/0286390 A1 * | 12/2005 | Minemura et al. | ......... | 369/116 |

FOREIGN PATENT DOCUMENTS

JP  2003141733 A  *  5/2003

* cited by examiner

*Primary Examiner*—Joseph D Torres
(74) *Attorney, Agent, or Firm*—Lee, Hong, Dergerman, Kang & Waimey

(57) ABSTRACT

Disclosed is a method and system enabling to remove a noise effectively by establishing types of shocks that may occur possibly and by sensing a shock using the error corresponding to the shock. The present invention includes the steps of reading a data recorded on a disk, detecting an error or errors from the read data using CIRC (cross interleaved Reed-Solomon code), counting a number of the detected errors, and of judging whether a shock is generated or not using the counted number of the errors.

12 Claims, 8 Drawing Sheets

METHOD AND SYSTEM FOR SENSING A SHOCK IN OPTICAL DISK DEVICE

TECHNICAL FIELD

The present invention relates to a method and system for sensing a shock in an optical disk device, and more particularly, to a method and system enabling to remove a noise effectively by establishing types of shocks that may occur possibly and by sensing a shock using the error corresponding to the shock.

BACKGROUND ART

FIG. 1A illustrates a block diagram of a general disk player and FIG. 1B illustrates a block diagram of a disk player having an anti-shock function added thereto.

A constitution of a general disk player is explained by referring to FIG. 1A as follows.

Referring to FIG. 1A, a conventional disk player includes an optical pickup device 100, a RF amplifier 105, an analog/digital converter (ADC) 107, a digital signal processing unit 110, and a control unit 125.

The optical pickup device 100 generates a light source to carry out a function of reading a record signal, and the RF amplifier 100 filters a RF analog signal which is read to input to carry out a shaping function.

The analog/digital converter (ADC) 107 samples the inputted RF signal with a constant speed according to a sample clock outputted from a sample clock generating unit to output to the digital signal processing unit 110.

And, the digital signal processing unit 110 carries out a signal processing on the digital data into a signal form recognizable by the control unit, and outputs the signal-processed data to the control unit 125.

FIG. 1B illustrates a block diagram of a disk player having an anti-shock function added thereto.

Referring to FIG. 1B, a disk player having an anti-shock function according to a related art includes an optical pickup device 100, a RF amplifier 105, an analog/digital converter (ADC) 107, a digital signal processing unit 110, a control unit 125, and a buffer memory 130.

The basic constitution of the disk player has bee explained in detail in FIG. 1A, which is skipped in the following description.

The disk player is very vulnerable to a shock due to its characteristics. When an external shock is impacted on the disk player, data of a disk cannot be read, whereby sound interruption is brought about in case of an audio disk.

Specifically, the external shock brings about severe problems in a portable disk player.

Hence, a disk player equipped with the anti-shock function is demanded.

A basic principle of a disk player equipped with the anti-shock function is explained as follows.

Data previously read from a disk are stored in a memory. When the data cannot be read due to the shock impacted thereon, the data having been stored in the memory are outputted, which is the basic concept.

While the stored data are outputted, the disk player reads the data again to prevent the problem of sound output.

Previously, a shock sensing is achieved by monitoring phase information of a servo system. When the shock is impacted on the disk player, a focus becomes abnormal to release PLL (phase lock loop). Thus, whether a shock occurs or not is sensed by monitoring the focus or PLL.

However, when the shock is sensed by monitoring the servo system, it is easy to sense a big shock. Yet, it is difficult to small shocks impacted continuously. For instance, when a portable disk player is used on jogging, walking, or driving a car, shocks that are not so big are continuously impacted thereon. When such small shocks are impacted continuously, it is unable to sense the shocks through the servo system.

In the related art, when a shock is sensed, an anti-shock function of a disk player is explained in detail as follows.

A buffer memory is provided for attaining a continuous data output when a mechanical shock that temporarily misaligns a read head with a data track on a disk occurs.

It is able to remove the influence that a shock having a limited time duration affects an output by means of reading data from the buffer memory. Namely, as far as a listener of the disk player is concerned, the shock has no influence on the output.

In order to achieve such a result, the data are read from the disk by high speed faster, i.e. twice faster, than that of reading the data from the buffer memory to record in the memory. In this case, as disclosed in EP-A-O 429 139, data are continuously read from a disk by high speed, a reading process is held when a buffer memory is full, and the reading process is resumed when the a prescribed portion of the buffer memory becomes empty.

Moreover, data are read from a disk by the same speed of reading data from a buffer memory for a normal time, the buffer memory is initially filled with the data before an output is initiated, and a reading speed of the data can be increased until the buffer memory is recharged when the buffer becomes empty by interruption of the data reading from the disk due to the head misalignment caused by a mechanical shock.

However, such an anti-shock function puts limitation on preventing the shock according to a capacity of the buffer memory. Namely, if the shock occurs for a period exceeding the capacity of the buffer memory, it is unable to prevent the shock anymore.

Namely, the duration time of the shock enabling to be compensated by the device is restricted by the capacity of the buffer memory. The shock of a compensation-available maximum length coincides with the time taken for reading the entire data inside the buffer memory.

Besides, if there is no sufficient time to recharge the buffer memory between a plurality of shocks, a series of shocks having the shorter duration time may exceed the memory capacity. Namely, as the frequency and number of times of the shocks increase, the buffer memory becomes emptied gradually.

For instance, if the device is applied to a portable disk player carried by a user participating in physical activities such as jogging and the like, continuous shocks may occur. Another example of generating the continuous shocks is that the device is used inside a car or other vehicles.

Thus, it is difficult for the related art to sense the continuous shocks as well as grasp the exact time point of the shock generation. Hence, it is difficult to judge whether to read the data again by deleting a certain amount of the buffer memory.

DISCLOSURE OF THE INVENTION

Accordingly, the present invention is directed to a method and system for sensing a shock in an optical disk device that substantially obviates one or more of the problems due to limitations and disadvantages of the related art.

An object of the present invention is to provide a method and system for preventing a noise caused by a corresponding shock by recognizing a shock pattern using the number of errors extracted through error detection by CIRC (Cross-Interleaved Reed-Solomon Code).

Another object of the present invention is to provide a method and system for effectively sensing small shocks continuously impacted thereon by detecting errors corresponding to various kinds of shocks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a shock sensing method in a disk player according to the present invention includes a step (a) of reading a data recorded on a disk, a step (b) of detecting an error or errors from the read data using CIRC (cross interleaved Reed-Solomon code), a step (c) of counting a number of the detected errors, and a step (d) of judging whether a shock is generated or not using the counted number of the errors.

Preferably, the step (b) is carried out every byte unit.

Preferably, the step (c) is carried out every frame unit.

Preferably, the step (d) judges whether the shock is impacted or not by comparing the counted number of the errors to a predetermined reference value.

Preferably, the shock sensing method further includes, if it is judged that the shock is impacted, a step of deleting the data of a corresponding frame from a buffer memory.

More preferably, the shock sensing method further includes a step of reading the data of the frame again to be stored in the buffer memory.

To further achieve these and other advantages and in accordance with the purpose of the present invention, a shock sensing method in a disk player includes a step (a) of reading a data recorded on a disk, a step (b) of detecting an error or errors from the read data using CIRC (cross interleaved Reed-Solomon code), a step (c) of counting a number of the detected errors each predetermined section, a step (d) of calculating a difference value between the counted number of the errors of the corresponding section and a predetermined first reference value, and a step (e) of judging whether a shock is impacted or not by adding the difference values to each other.

Preferably, the step (b) is carried out every byte unit.

Preferably, in the step (c), the predetermined section is a plurality of predetermined frames and the number of the errors of each of the frames is counted.

Preferably, in the step (e), it is judged whether the shock is impacted or not by comparing a value resulted from adding the difference values to each other to a predetermined second reference value.

Preferably, the shock sensing method further includes, if it is judged that the shock is impacted, a step of deleting the data of the predetermined section from a buffer memory.

Preferably, the shock sensing method further includes a step of reading the data of the predetermined section again to be stored in the buffer memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1A:
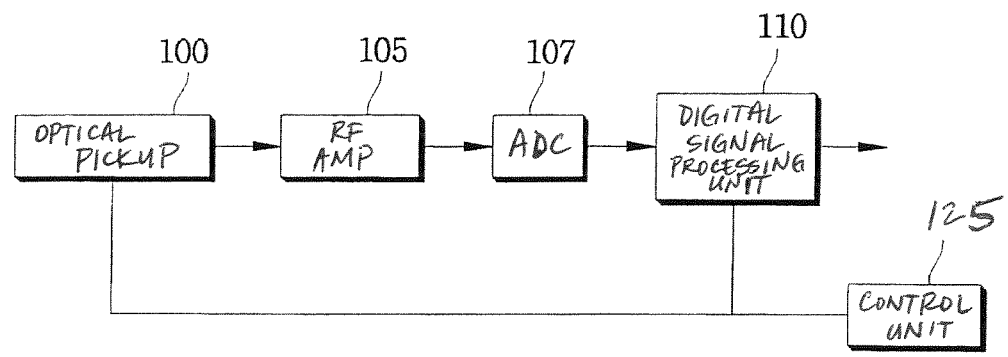
FIG. 1A illustrates a block diagram of a general disk player.
Figure 1B:
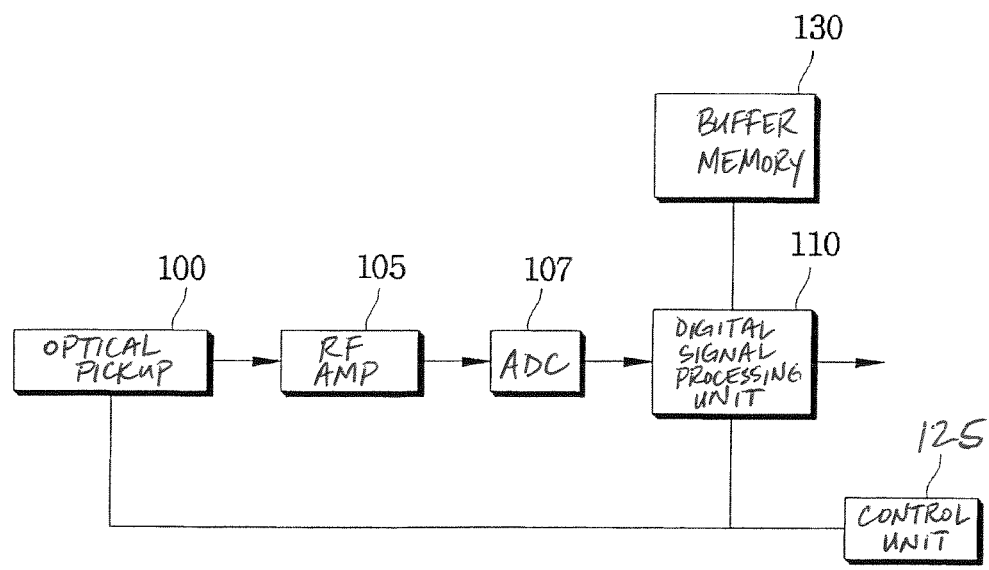
FIG. 1B illustrates a block diagram of a disk player having an anti-shock function added thereto.
Figure 2A:
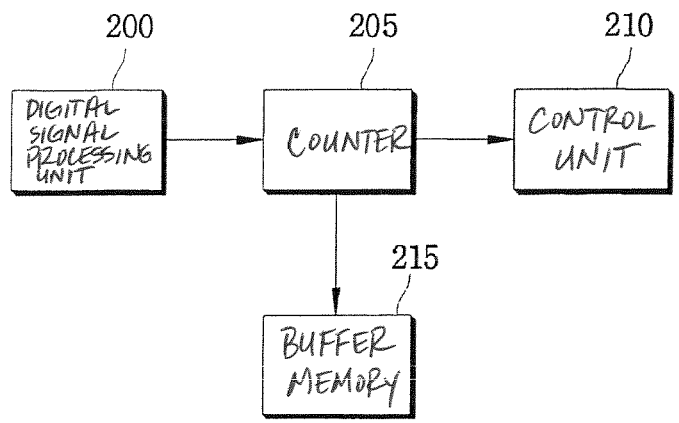
FIG. 2A illustrates a block diagram of a shock sensing system according to one preferred embodiment of the present invention.

FIG. 2A illustrates a block diagram of a shock sensing system according to one preferred embodiment of the present invention.

Referring to FIG. 2A, a shock sensing system according to the present invention includes a digital signal processing unit 200, a counter 205, a control unit 210, and a buffer memory 215.

First of all, a disk format is explained as follows before FIG. 2A is described.

Fifty-one companies have been participated in designating audio disks fitting disk standards, and three systems are proposed to be called DAD (digital audio disk).

Table 1 illustrates specifications of three DADs.

The present invention is explained by referring to Table 1 as follows.

TABLE 1

| | Philips, SONY | Victor | Telefunken TeleDecca |
|---|---|---|---|
| Proposing company | | | |
| Name abbreviation | Compact disk, CD | Audio high-density disk, AHD | Mini & micro disk, MD |
| Diameter | 12 cm | 26 cm | Mini 13.5 cm  Micro 7.5 cm |
| Playing method | Optical non-contact | Capacity contact | Piezoelectric contact |
| Record frequency range | 20 Hz~20 kHz | 20 Hz~20 kHz | 20 Hz~20 kHz |
| Distortion rate | Below 0.05% | Below 0.05% | Below 0.05% |
| Dynamic range | Over 90 dB | Over 90 dB | Over 85 dB |
| Wow and Fluter | Below measurement limit | Below measurement limit | Below measurement limit |
| Recording minutes | 60~80 | 60 | Mini 60  Micro 10 |

Currently, the optical system of Philips and SONY is taken as standards. Philips and SONY contracted 'Red Book' in 1982. In the Red Book, a method of recording/outputting a digital audio signal in/from a disk is disclosed as well as a standard for a disk player on reading the disk optically is defined.

A method of sensing a shock according to the present invention is explained as follows centering on the SONY-Philips standard. Yet, it is a matter of course that a scope of the present invention is not limited to the SONY-Philips system.

In the SONY-Philips standards, one second comprises seventy-five frames and each frame stores the information for audio data corresponding to 13.5 ms. And, data of 2,352 bytes are generally stored therein.

A constitution of a shock sensing system according to the present invention is explained by referring to FIG. 2A as follows.

The digital signal processing unit 200 according to the present invention preferably carries out an error correcting function as well as a basic function of a general digital signal processing unit.

Even if an optical media is reliable, it may happen that errors are brought about due to serious damage on a disk surface or a fabrication problem.

Hence, for error detection of the disk, an error correction system called CIRC (Cross Interleaved Reed-Solomon Code) is adopted. The CIRC combines three kinds of error correction systems including cross-coding, interleaving, and Reed-Solomon coding.

The counter 205 carries out a function of calculating the number of errors generated from the error correcting process of the digital signal processing unit 200. The digital signal processing unit 200 marks a flag on a portion having the error on the error correcting process. The counter 200 counts the flags in the previously designated range to calculate the number of errors. In this case, the designated range is preferably a frame unit.

The control unit 210 detects whether a shock occurs or not according to a previously designated method using the number of errors. A method of sensing a shock according to the present invention will be explained in detail in FIGS. 4A to 5C.

The buffer memory 215 is a memory storing the previously read data therein. If it is unable to read the data due to the generation of shock or sound quality is degraded by noise, the data are read again while the data of the buffer memory are outputted to prevent the noise caused by the shock.

Figure 2B:
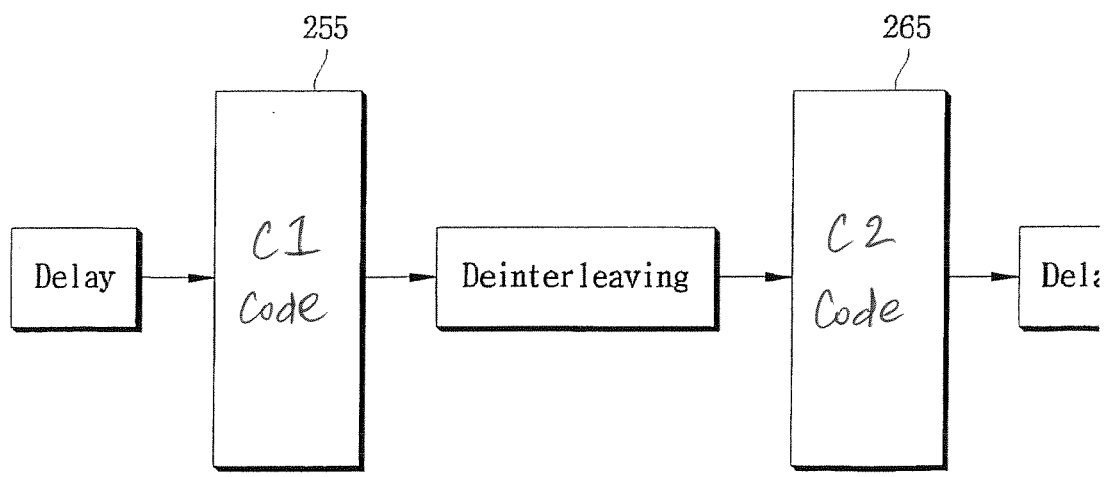
FIG. 2B illustrates a block diagram of correcting errors in a digital signal processing unit according to one preferred embodiment of the present invention.

FIG. 2B illustrates a block diagram of correcting errors in a digital signal processing unit according to one preferred embodiment of the present invention.

In the following description, an error correcting method according to the present invention is explained by taking an audio disk as a reference.

An audio disk includes a plurality of frames, and each of the frames comprises total 588 bits. The frame includes data of 24 bytes, a cross interleaved Reed-Solomon code of 8 bytes, a synchronization signal of 24 bits, a sub-code of 1 byte, and a margin signal.

An audio signal is interleaved instead of 'continuous', and is realized by the cross interleaved Reed-Solomon code (CIRC).

The cross interleaved Reed-Solomon code enables to overcome the trouble of playing even if errors are generated from scratch, dust, fingerprint, vibration, and the like.

The data regenerated from the disk bring about random or bust errors due to noise, disk damage, and the like. Two Reed-Solomon codes are added to an error correction code by the cross interleaved Reed-Solomon code (CIRC) before and after interleave. In this case, the interleave disperses the bust error.

Moreover, the Reed-Solomon code is Galois fields to correct multiple errors, and use a known symbol set and various mathematical characteristics effectively and efficiently.

In this case, if the combination of the interleave and the Reed-Solomon code is called the cross interleave Reed-Solomon code, the error correction of the disk is carried out.

The disk used for the disk player demands a high reliance that a bit error rate is below $10^{-12}$, it is preferable to include other error correction codes completed by block unit as well as the error correction function of the disk itself.

A cross interleaved Reed-Solomon code (CIRC) according to the present invention is explained by referring to FIG. 2B as follows.

A signal recorded on a disk is regenerated as a RF signal by an optical header, and the regenerated RF signal is inputted to a digital signal processing unit.

The digital signal processing unit carries out the error correction of the disk itself using the error correction code by the cross interleaved Reed-Solomon code (CIRC) including a C1 code 255 and a C2 code 265. Yet, there may exist data presumed that an error fails to be corrected. After the first error correction, a second error correction (Layer ECC) is carried out on the data on which the first error correction has been carried out using a C2 error pointer, a P-series parity, and a Q-series parity.

Yet, it is impossible to achieve the error correction perfectly even if the above-explained error correction process has been carried out. Specifically, the problem becomes more serious if the error is caused by a shock.

Hence, a portion from which an error is detected in the error correction process is marked by a flag to output through a C2PO (C2 parity out) lead. The flag is counted by the counter by block unit, i.e. frame unit.

Thereafter, a shock type is grasped using the number of errors to detect the shock.

Figure 3A:
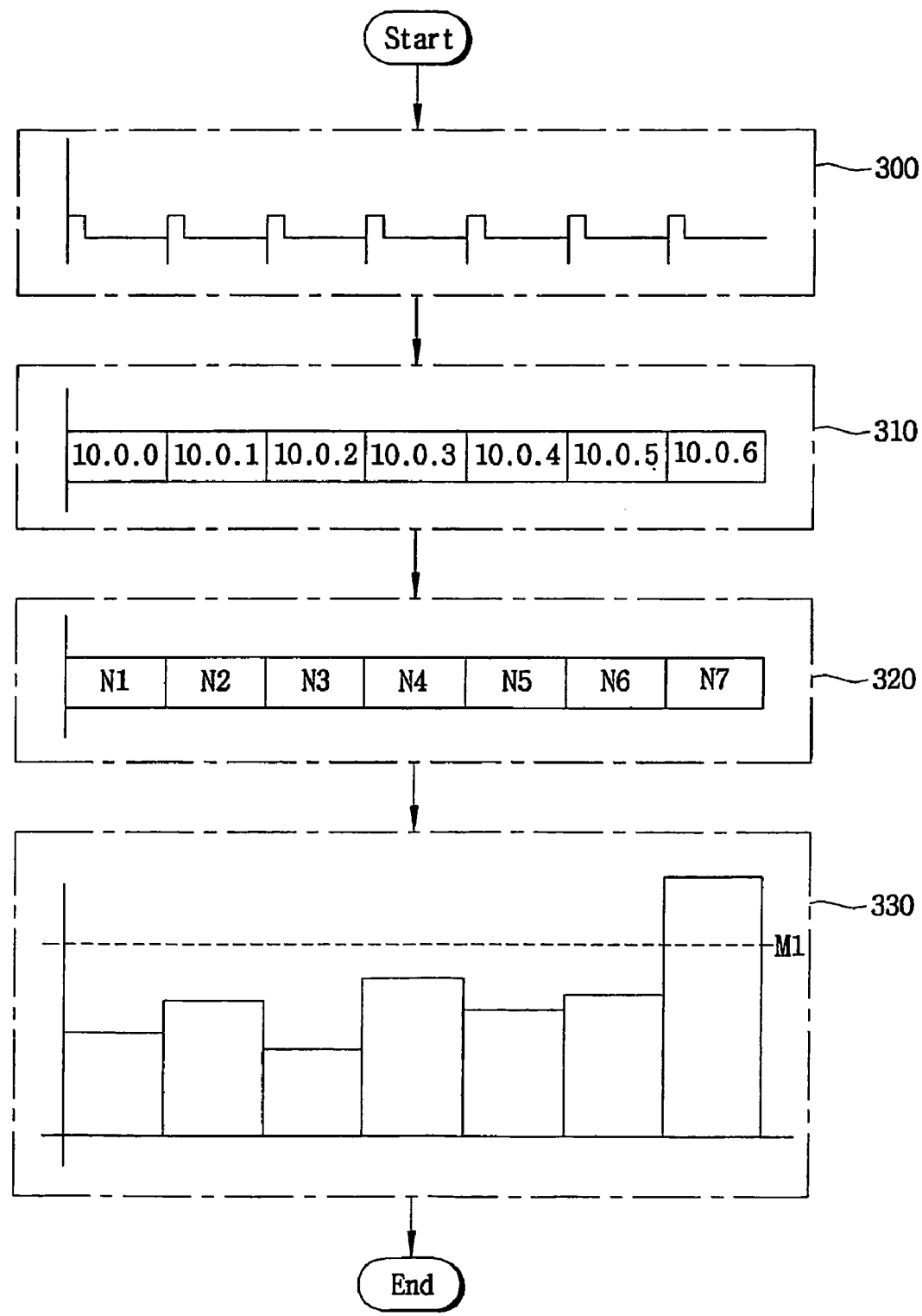
FIG. 3A illustrates a diagram of a method for error calculation in accordance with blocks according to one preferred embodiment of the present invention.

FIG. 3A illustrates a diagram of a method for error calculation in accordance with blocks according to one preferred embodiment of the present invention.

A sector is a minimum unit for storing data in a disk, and 650 MB (75 sectors×60 seconds×74 minutes) can be stored in a single CD. A size of the sector differs according to a recording mode, and 2,048 bytes can be normally stored in a single sector of a general CD-ROM.

The red book teaches that the number of tracks that can be stored in a CD is 99 and a gap of 2 seconds (150 sectors) lies between the tracks. An audio CD is constructed with a frame structure to read the recorded data with a uniform speed, and a uniform amount of data is recorded by frame unit in each track.

And, each frame includes a user data of 24 bytes and data for synchronization and control, error correction, and the like. The frames are not arranged sequentially but allocated with a predetermined rule to be entangled with each other.

Such an allocation of the frames enables to prevent the frame from being entirely damaged if a specific portion of the disk is scratched. Hence, it is able to read the original data through the error correction. Each of the tracks of the audio CD includes sectors and each of the sectors includes an audio of $1/75$ second.

Moreover, each of the sectors has an error search and error correction code to prevent the data error and damage, thereby enabling to compensate the error. And, each of the sectors includes a controller having information of informing a current music playing location.

An error checking method according to the present invention is explained by referring to FIG. 3A as follows.

Referring to a step 300, considering the SONY-Philips standards, a frame synchronization signal 300 synchronizing a frame is periodically generated.

Referring to a step 310, a frame is read to correspond to the frame synchronization signal. The frame is constituted by 'minute: second: frame' unit by taking an audio disk as a reference. And, the frame means a single sector if Red Book is cited. An audio data corresponding to one second occupies seventy-five sectors, and one sector means a time corresponding to $1/75$ second.

Hence, a time, '10:00:00', has a meaning of '10 minutes, 0 second, +(0/75) second'.

Referring to a step 320, error correction is carried out on each of the frames, and a flag is marked on an error-occurring portion by frame unit in the process of the error correction.

The error correction process includes a step of checking whether an error exists in each byte included in the frame. Hence, the flag is marked on the portion of each of the bytes having the error.

Thereafter, the flag is counted by the counter to calculate the number of errors by frame unit.

Referring to a step 330, a bar graph diagramming the number of errors is shown.

In aspect of one embodiment of the present invention, when the predetermined allowable number of errors is called 'M1', if the number of errors exceeds 'M1', it is judged that the error is uncorrectable and that a shock occurs. Hence, the frame corresponding to the error-occurring portion is read in again.

Figure 3B:
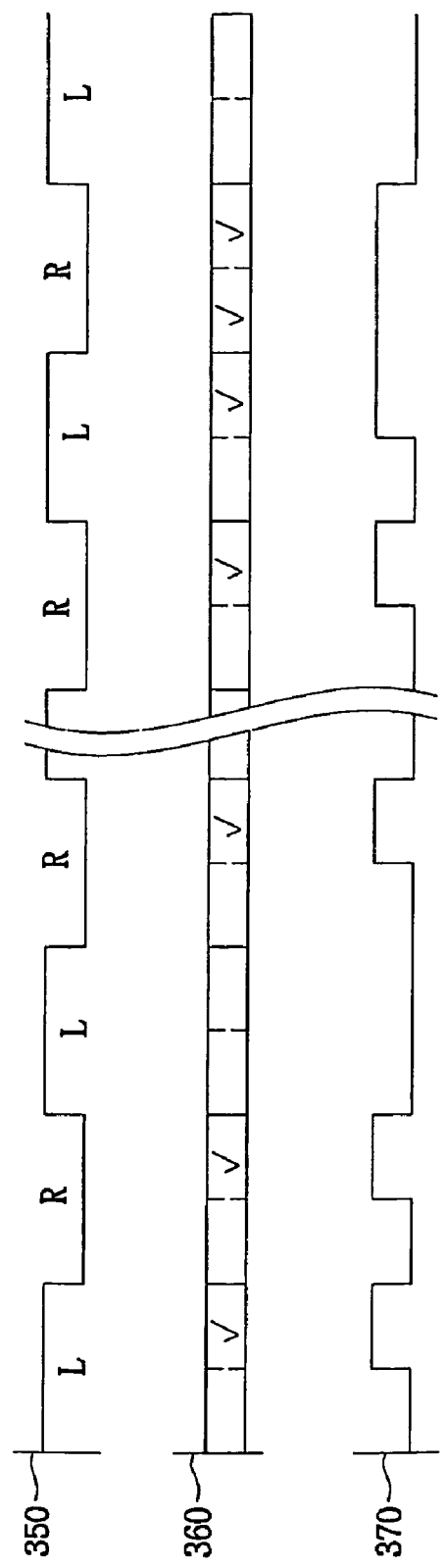
FIG. 3B illustrates a diagram of a process for checking errors by each byte included in a frame according to one preferred embodiment of the present invention.

FIG. 3B illustrates a diagram of a process for checking errors by each byte included in a frame according to one preferred embodiment of the present invention.

Referring to FIG. 3B, a stereo clock signal 350, a data signal 360, and an error detection signal 370 are shown.

The stereo clock signal 350 is a clock signal generated by a cycle of two bytes.

The data signal 360 is portioned by two bytes, but an error check for the data signal is performed every one byte unit.

After the error check, if an error is detected, the error detection signal 370 having a flag marked on the corresponding byte is generated.

The error detection signal 370 is outputted to a C2PO (C2 parity out) lead to input to a counter. The counter then counts the flag by frame unit to calculate the number of errors.

Figure 4A:
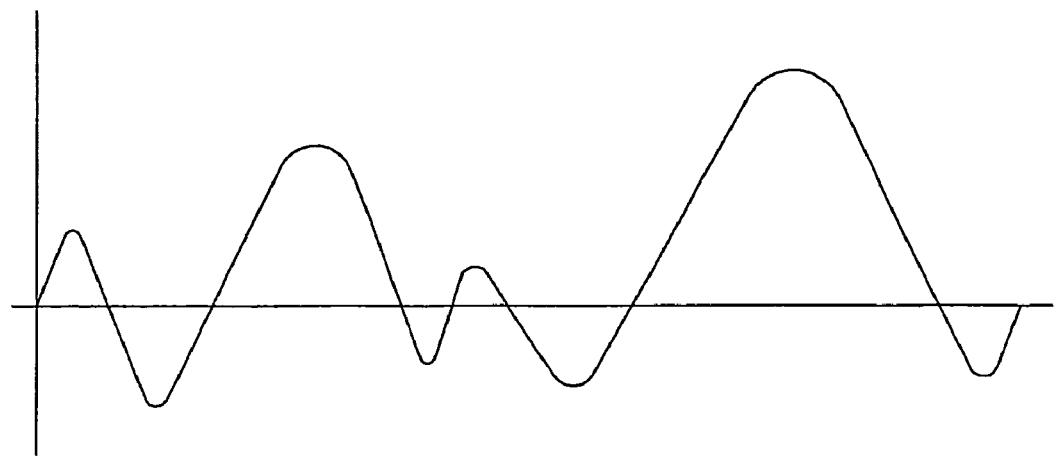
FIG. 4A illustrates a graph of a shock waveform according to one preferred embodiment of the present invention.

FIG. 4A illustrates a graph of a shock waveform according to one preferred embodiment of the present invention.

Referring to FIG. 4A, an example of a random shock waveform as a most general shock waveform is shown.

The number of errors increases to correspond to a magnitude of the shock waveform. The number of errors measured on the generation of the shock waveform is shown in FIG. 4B.

Figure 4B:
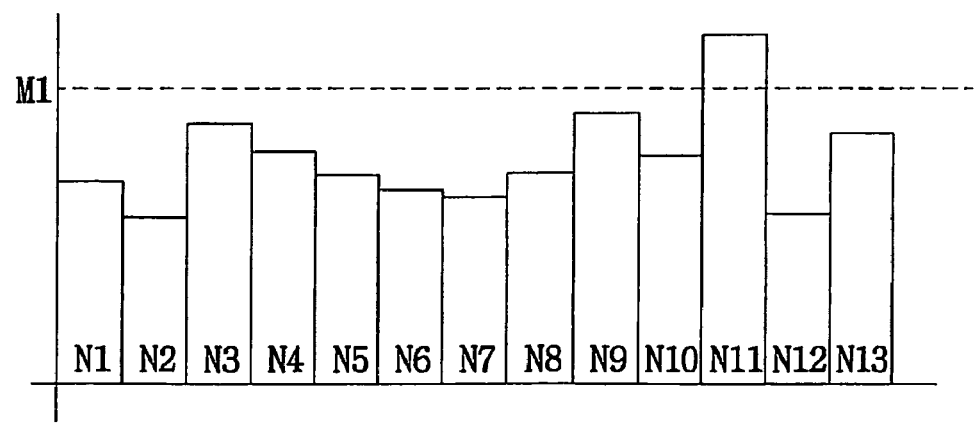
FIG. 4B illustrates a graph of the number of errors in accordance with a shock waveform according to one preferred embodiment of the present invention.

FIG. 4B illustrates a graph of the number of errors in accordance with a shock waveform according to one preferred embodiment of the present invention.

Referring to FIG. 4B, the number of errors increases to correspond to a magnitude of a shock.

The control unit judges that a shock occurs if the number of errors is equal to or greater than 'M1' by comparing the number of errors of each frame to the error-allowable maximum number 'M1'. And, the control unit reads the frame corresponding to the error-occurring portion again.

In FIG. 4B, the frame N11 exceeds the error-allowable maximum number in FIG. 4B, and returns to the frame location to read the data again.

Figure 4C:
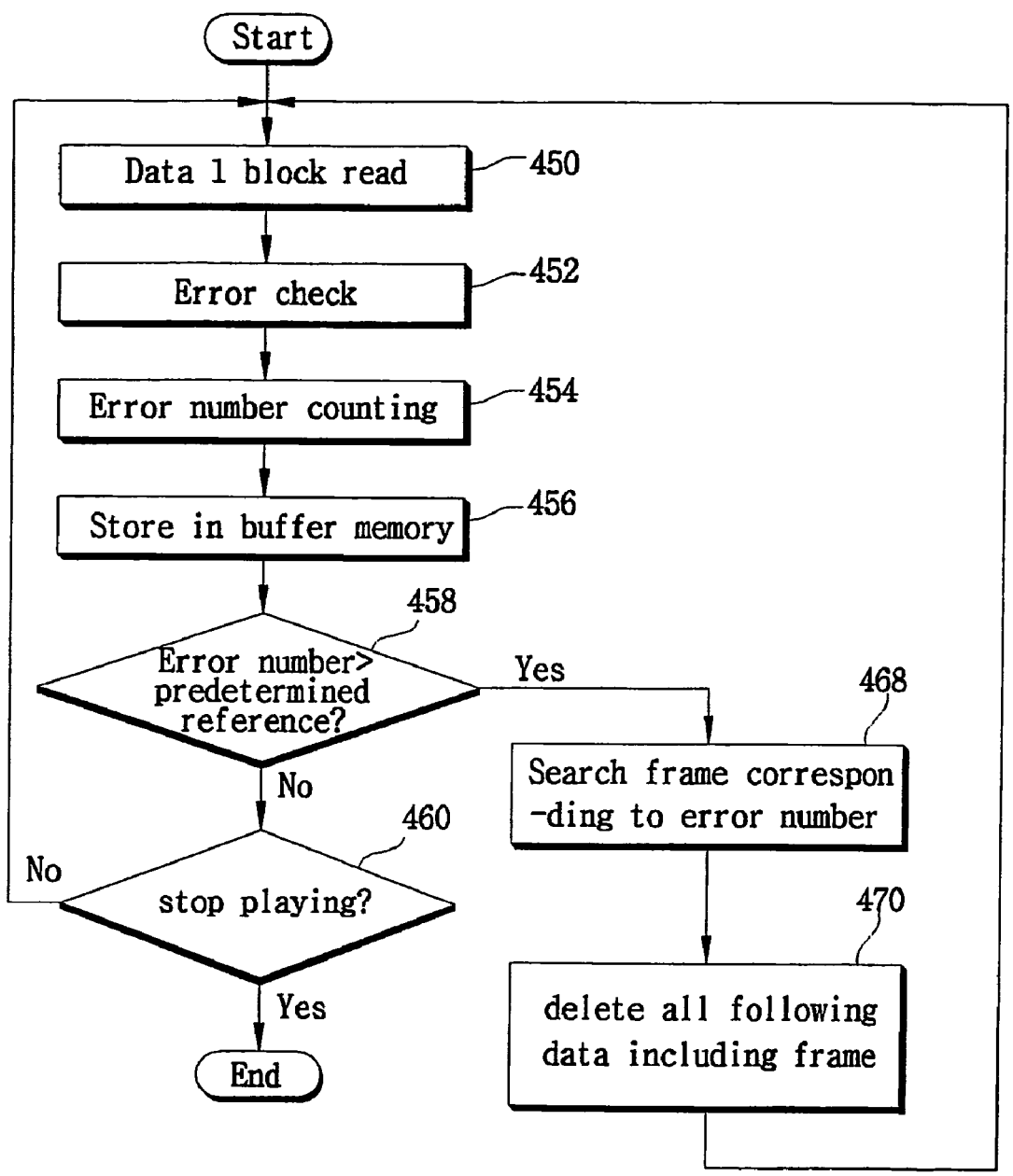
FIG. 4C illustrates a flowchart of a process for sensing a shock according to one preferred embodiment of the present invention.

FIG. 4C illustrates a flowchart of a process for sensing a shock according to one preferred embodiment of the present invention.

A data of one frame is read in a step 450, and the read data is stored in the buffer memory in a step 452.

In a step 452, the digital signal processing unit carries out an error correction on the read data. The digital signal processing unit marks a flag on a portion where an error is found and outputs the data to the C2PO (C2 parity out) lead.

In a step 454, the counter connected to the C2PO (C2 parity out) lead counts errors of each frame to calculate the number of errors.

In a step 456, the data outputted to the C2PO lead is stored in the buffer memory.

In a step 458, the control unit detects that a shock occurs if the number of errors is equal to or greater than 'M1' by comparing the number of errors of each frame to the error-allowable maximum number 'M1'. And, the control unit reads the frame corresponding to the error-occurring portion again.

In a step 468, a frame exceeding the error-allowable maximum number is searched. In a step 470, all the data stored in the buffer are deleted for the following frames including the searched frame.

And, the frame corresponding to the error-occurring portion is retrieved to read the data again.

As a result of the judgment of the step 458, if the error is smaller than an allowable reference, the above-explained operations are repeated unless the disk player stops being driven at a stop 460.

Figure 5A:
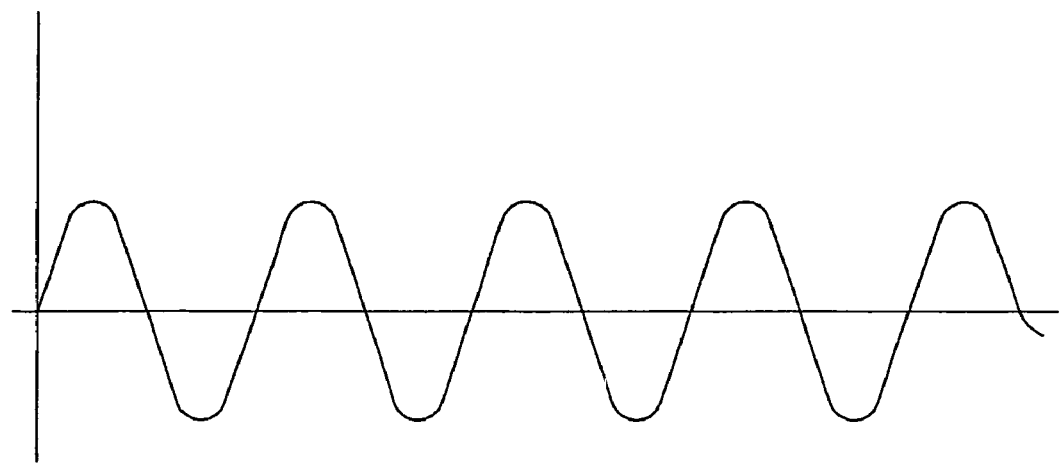
FIG. 5A illustrates a graph of a shock waveform according to another preferred embodiment of the present invention.

FIG. 5A illustrates a graph of a shock waveform according to another preferred embodiment of the present invention.

Referring to FIG. 5A, shown is a shock pattern appearing when uniform shocks are repeatedly generated for a certain time.

When a shock having the waveform shown in FIG. 5A is impacted, it is highly possible to degrade a sound quality and generate an error even if the shock is insufficient to have influence on reading data.

In such a case, a predetermined error number 'M2' is set to be smaller than the error-allowable maximum number 'M1' and comparison to the M2 is carried out to detect the error.

A shock sensing method is explained by referring to FIG. 5B as follows.

Figure 5B:
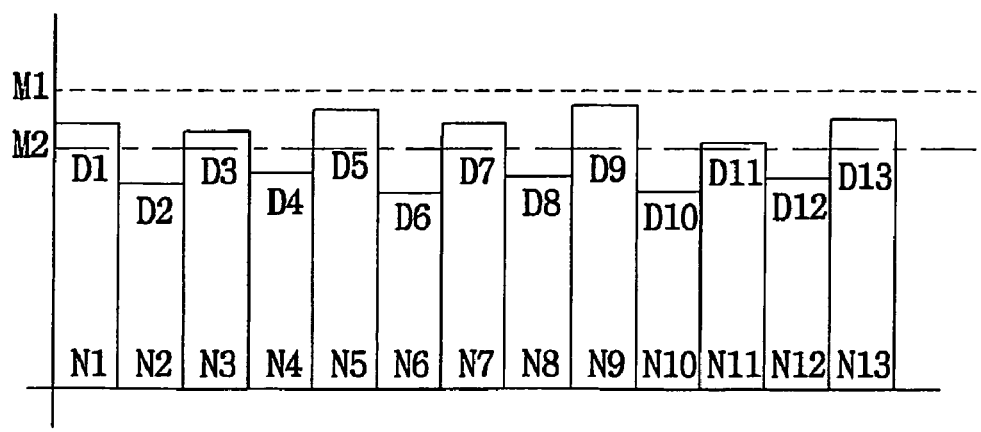
FIG. 5B illustrates a graph of the number of errors in accordance with a shock waveform according to another preferred embodiment of the present invention.

FIG. 5B illustrates a graph of the number of errors in accordance with a shock waveform according to another preferred embodiment of the present invention.

When small shocks, as shown in FIG. 5A, are repeated for a certain time, it is unable to detect the shock by comparing the number of errors in a single frame.

Hence, in another embodiment of the present invention, frames corresponding to a predetermined number are designated, and each difference between the error number of each of the designated frames and 'M2' is added to each other to sense the shock.

If a capacity of the buffer memory is 10 seconds, it is preferable to set the frame number as corresponds to 10 seconds since the shock can be prevented for the errors for 10 seconds.

A difference D between an error number N and an allowable range M2 is found every frame.

If the error number is equal to or greater than 'M2', the difference D has a positive (D) sign. If the error number is smaller than 'M2', the difference D has a negative (−) sign.

The above-found differences are added to each other to correspond to the previously designated frame number.

Referring to FIG. 5B, if a value calculated by adding like 'D1−D2+D3−D4+D5−D6+D7− . . . +Dn' is equal to or greater than a predetermined reference value, it is judged that a shock is impacted. And, an initial frame of the frames is retrieved to read data again.

Figure 5C:
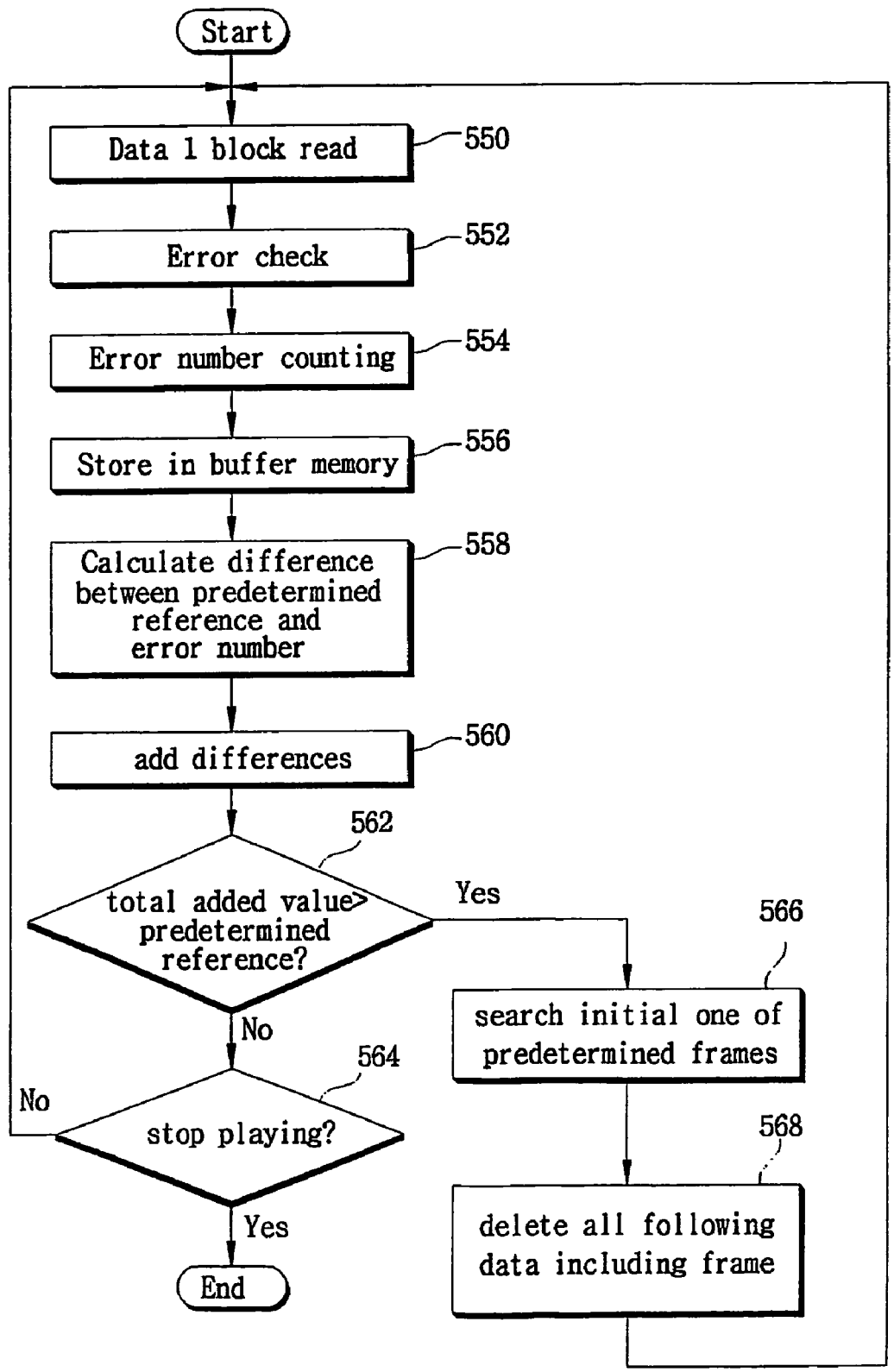
FIG. 5C illustrates a flowchart of a process for sensing a shock according to another preferred embodiment of the present invention.

FIG. 5C illustrates a flowchart of a process for sensing a shock according to another preferred embodiment of the present invention.

In a step 550, a data 1 block is read in. And, in a step 552, the read-in data is stored in a buffer memory.

In a step 552, a digital signal processing unit carries out an error correction on the data and a flag is marked on a portion where an error is found to be outputted to a C2PO (C2 parity out) lead.

In a step 554, a counter connected to the C2PO (C2 parity out) lead adds the errors each frame to calculate the number of errors.

In a step 556, the data outputted to the C2PO is stored in the buffer memory.

In a step 558, a difference between the number of errors and a predetermined reference 'M2' is found. Namely, a difference value D is calculated by comparing the number of errors of each of the frames to a predetermined error-allowable number 'M2' and the difference value D is stored.

In a step 560, the difference values in a plurality of the predetermined frames are added to each other. Namely, the steps 550 to 558 are repeated to add the difference values of the step 560 to each other.

In a step 562, a control unit judges whether the added value is equal to or greater than the predetermined reference value.

In a step 564, it is sensed that a shock occurs if the added value is equal to or greater than the predetermined error-allowable value. In a step 566, the initial one of a plurality of the predetermined frames 556 is searched. In a step 568, the following buffer amount including the initial frame is entirely deleted.

As a result of the judgment of the step 562, if the added value is smaller than the predetermined reference value, the above-explained operations are repeated unless the disk player stops being driven at a stop 564.

INDUSTRIAL APPLICABILITY

Accordingly, the method and system for sensing the shock according to the present invention enables to recognize the shock pattern using the number of errors extracted through the error detection by the cross interleaved Reed-Solomon code (CIRC), thereby enabling to prevent the shock to correspond to the shock.

Moreover, the present invention enables to sense the small shocks continuously impacted thereon, thereby enabling to prevent a noise generated from walking or driving a car.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A shock sensing method in a disk player, comprising:
   a step (a) of reading a data recorded on a disk;
   a step (b) of detecting an error or errors from the read data using CIRC (cross interleaved Reed-Solomon code);
   a step (c) of counting a number of the detected errors; and
   a step (d) of judging whether a shock is generated or not using the counted number of the errors.

2. The shock sensing method of claim 1, wherein the step (b) is carried out every byte unit.

3. The shock sensing method of claim 1, wherein the step (c) is carried out every frame unit.

4. The shock sensing method of claim 1, wherein the step (d) judges whether the shock is impacted or not by comparing the counted number of the errors to a predetermined reference value.

5. The shock sensing method of claim 1, further comprising, if it is judged that the shock is impacted, a step of deleting the data of a corresponding frame from a buffer memory.

6. The shock sensing method of claim 5, further comprising a step of reading the data of the frame again to be stored in the buffer memory.

7. A shock sensing method in a disk player, comprising:
   a step (a) of reading a data recorded on a disk;
   a step (b) of detecting an error or errors from the read data using CIRC (cross interleaved Reed-Solomon code);
   a step (c) of counting a number of the detected errors each predetermined section;
   a step (d) of calculating a difference value between the counted number of the errors of the corresponding section and a predetermined first reference value; and
   a step (e) of judging whether a shock is impacted or not by adding the difference values to each other.

8. The shock sensing method of claim 7, wherein the step (b) is carried out every byte unit.

9. The shock sensing method of claim 7, wherein, in the step (c), the predetermined section is a plurality of predetermined frames and the number of the errors of each of the frames is counted.

10. The shock sensing method of claim 7, wherein, in the step (e), it is judged whether the shock is impacted or not by comparing a value resulted from adding the difference values to each other to a predetermined second reference value.

11. The shock sensing method of claim 7, further comprising, if it is judged that the shock is impacted, a step of deleting the data of the predetermined section from a buffer memory.

12. The shock sensing method of claim 7, further comprising a step of reading the data of the predetermined section again to be stored in the buffer memory.

* * * * *